April 22, 1958 C. F. BALL 2,831,568
EXTENSIBLE FLEXIBLE SHAKER CONVEYORS
Filed March 22, 1954
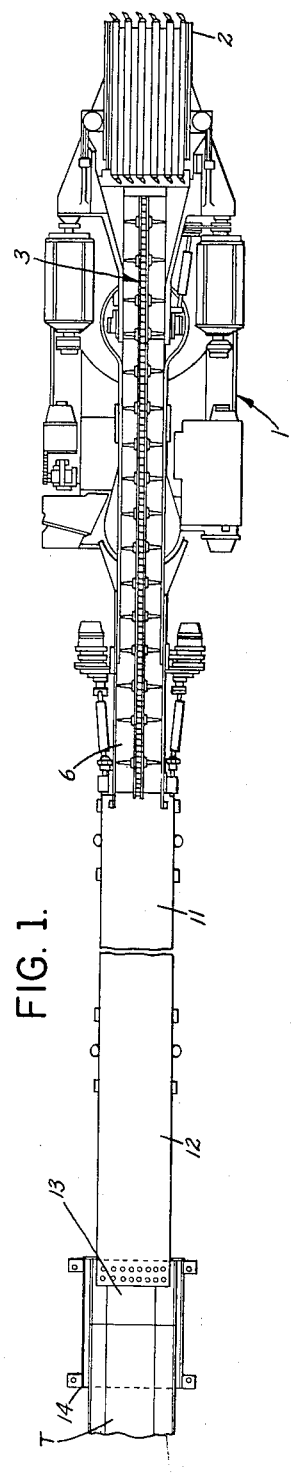
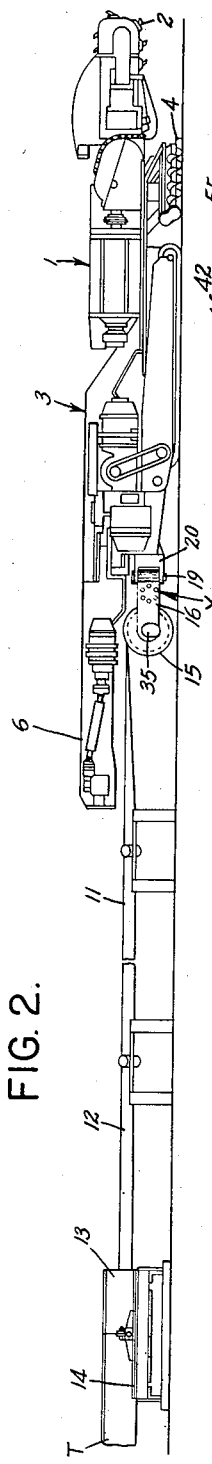
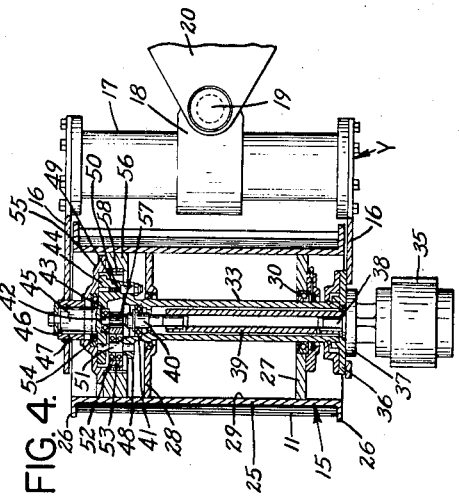
INVENTOR:
CHARLES F. BALL
BY
Louis A. Maxson
ATTORNEY United States Patent Office 2,831,568
Patented Apr. 22, 1958

2,831,568

EXTENSIBLE FLEXIBLE SHAKER CONVEYORS

Charles F. Ball, Franklin, Pa., assignor to Joy Manufacturing Company, Pittsburgh, Pa., a corporation of Pennsylvania Application March 22, 1954, Serial No. 417,649

10 Claims. (Cl. 198—220)

This invention relates to shaker conveyors, and more particularly to shaker conveyors of the flexible strip type, and especially to that type of shaker conveyors in which a flexible shaker conveyor element is stored on a reel or drum and drawn off the latter as the working length of the flexible shaker element is increased.

The invention finds particular utility in connection with "continuous miners." A widely used form of "continuous miner" removes from a solid mineral face, by the disintegration of a number of upright bands, an arcuate section of the full width of the face and on the order of one and one-half feet thick, every three or four minutes, during which time the disintegrated mineral is discharged, except for the small intervals incident to repositioning of the disintegrating mechanism for attack on new upright bands, relatively continuously. To carry away the material delivered by the miner, shaker conveyors have been used, but it has been necessary to shut down the miner, while an extension of the shaker conveyor is being effected, many times a shift. It is, therefore, much to be desired that some form of extensible conveyor mechanism to be provided to deliver material from a periodically advancing miner to the inbye end of a main shaker conveyor trough line or equivalent flexible conveyor strip, and thereby make shutdowns for the purpose of advancing the inbye end of the main conveyor much less frequent.

It is, therefore, a primary object of the present invention to provide an improved flexible shaker conveyor for delivering material received, as from a "continuous miner," to the inbye end of a main shaker conveyor, which improved flexible shaker conveyor shall be automatically extensible in length as the machine from which it receives material to be delivered to the main conveyor moves away from the latter. Desirably the improved flexible shaker conveyor shall receive a portion of its shaker movement from the main shaker conveyor, and shall have the remainder of its shaker movement effected, under the control of the movement of the main shaker conveyor, by an independently powered system which shall include a drum or reel on which a portion of the flexible conveyor element of said improved flexible conveyor is wound, which reel has constantly applied to it a force tending to rotate it in a winding direction, but which is such as to be overcome by the traction exerted on the end of said flexible conveyor element in an outbye direction periodically by the conveyor element of the main conveyor. Desirably, a hydraulic system for exerting force in the winding-in direction on the drum or reel is provided, including a hydraulic motor connected in driving relation with the reel, and a hydraulic fluid supply and receiving system associated with the motor including an accumulator in communication with the motor supply connection and a pump for supplying fluid at an appropriate rate to a relief valve controlled line which communicates with the accumulator and the motor supply connections. An exhaust line for the motor, when it is acting to drive the reel, and a fluid suction line for the pump each communicate with a tank or sump for a hydraulic fluid. A manually controlled connection between the motor supply connection and the motor exhaust line.

Other objects and advantages of the invention will hereinafter appear.

In the accompanying drawings, in which one illustrative embodiment of the invention has been shown, Fig. 1 is a plan view of certain portions of a mining and conveying apparatus in which the present invention is incorporated, showing the invention in use.

Fig. 2 is a side elevation of the same apparatus.

Fig. 3 is a side elevation on a larger scale of a reel, the driving motor therefor, and the support and pivotal mounting of the reel with respect to a continuous miner.

Fig. 4 is a horizontal section on the planes of the line 4—4 of Fig. 3, through the reel and portions of the drive of the latter.

Fig. 5 is a diagrammatic view showing the hydraulic system of the invention in an illustrative form.

Referring now to the drawing, and first to Figs. 1 and 2, it will be observed that a continuous miner 1 is shown, provided with a disintegrating mechanism 2, which is adapted to disintegrate and remove material from a solid mineral vein and to effect delivery of the disintegrated material to a conveyor system generally designated 3. A cleanup 4 is provided to aid in the removal from the mine floor of any material which may escape from the apparatus and pass to the mine floor. The conveyor system 3 of the miner has a discharge conveyor section 6, and at its rearward end (this is shown as its left-hand end in Figs. 1 and 2) this is designed to discharge to a supplementary conveyor strip 11. The supplementary conveyor strip is attached at its outbye end 12 to a reciprocatory main conveyor end element 13, preferably guided for reciprocatory movement as on a guide frame 14 and arranged at the inbye end of a main conveyor pan line or trough line T which, with its end element 13, is suitably actuated in any well known manner with a shaker conveyor motion adapted to move material from its inbye to its outbye end (not shown). It will be understood that the term "main" does not imply that the conveyor so characterized is a sole one, but rather that it provides at least the innermost end of a conveyor system that occupies a relation of some permanence at least to the mine.

To the main conveyor end element 13 there is attached in any suitable manner the outbye end of the supplementary conveyor strip 11, which strip may desirably be made of stainless steel of a thickness of .020" to .025," and of a width of perhaps 30 inches. The other end of the strip 11 is adapted to be wound upon a drum or reel 15, and to be payed off therefrom, and the drum 15 is suitably supported by a yoke frame Y at one end of which there is arranged a transversely extending, herein cylindrical, spacer element 17 which extends through a suitable pivot-providing collar-like element 18, and the collar-like element is pivotally supported for turning on a vertical axis 19 by a projecting portion 20 secured to the rearward end of the continuous miner 1. By reason of this mounting the drum may swing in such a manner as to permit the axis of the drum at all times to be perpendicular to the direction in which the supplementary strip extends. The drum 15 includes a cylindrical portion 25 on which the supplemental strip 11 is adapted to be wound, with any suitable connection established between the strip 11 and the drum. End flanges 26 are provided at the opposite ends of the portion 25. The drum 15 is provided with annular plate portions 27 and 28 fixed at their outer peripheries to the inner wall 29 of the portion 25. The annular plate portion 27 carries a bearing 30 surrounding a tubular member 33. The tubular member 33 is supported at one end (the end at which a drving motor 35 for the drum is arranged), by a plate portion 36 secured to a side plate 16. The plate portion 36 supports mounting bracket 37 for the motor 35, and the motor has a driving shaft 38 which extends through the bracket 37 and into driving relation with an inner, rotatable, drive tube 39 whose opposite end is suitably secured in driving relation to a shaft 40. The shaft 40 is journaled at 41 in an extension beyond the plate portion 28 of the tubular member 33, and has a reduced portion 42 which extends into a bearing 43 supported by a support plate 44 integral with a stub shaft 45 which is keyed at 46 in a sleeve portion 47 fixed to the other of the plates 16.

Between an enlarged head 48 on the tubular member 33 and the support plate 44 there lie a plurality of bosses 49, projecting from the support plate, and to the ends of these the enlarged head 48 is fixed as by screws 50. A plurality of shafts 51 extend also between the support plate 44 and the enlarged head 48, in the intervals between the bosses 49, and these shafts support bearings 52 for intermediate pinions 53. The end of the drum or reel is journaled on a bearing 54 supported on the stub shaft 45, and engaged by a radially inwardly extending plate portion 55 secured to a member 56 fixed to the drum. Thus the drum is rotatably supported on a rigid, non-rotatable, rugged cross structure extending between the side plates 16. The pinions 53 are engaged and driven by a spur pinion 57 on the shaft 40 and they engage at their outer peripheries an internal gear 58 mounted within the member 56 secured to the inner wall 29 of the drum 15 and imparting rotation to the latter when the gear 58 is turned.

The motor 35 may desirably be of the intermeshing gear type and admission of fluid under pressure to one side of the mesh line of its rotors will cause, as the motor is connected, winding of a portion of the supplemental strip on the reel 15. When the supplementary strip is pulled off the reel it will cause the motor 35 to act as a pump and discharge fluid into the line through which it was supplied with operating medium before the direction of rotation of the reel was reversed. The movements of the trough line T are effected with such power that they override the motor 35, that is, despite the exertion of its full potential power, the motor 35 will be rotated backwards when the strip 11 is pulled in an outbye direction by the trough line T.

In Fig. 5 the motor 35 is shown in association with a suitable motor driven pump 65 which takes fluid via a suction line 66 from a suitable sump or reservoir 67 and discharges it to a discharge line 68 which conducts the fluid under pressure to the motor 35. The motor 35 is connected at the opposite side of its rotor mesh line to a conduit 69 which leads back to the sump 67. A suitably set adjustable relief valve 71 controls the discharge through conduits 72 and 73, when the pressure in the line 68 gets high enough, from that line, back to the sump. An accumulator 75, whose function in the apparatus will shortly be explained, communicates at 76 with the pump discharge line 68. A stop valve controlled conduit 77 may be used to connect the conduits 68 and 69 when it is desired to stop fluid supply to the motor 35 and to interconnect the opposite sides of the latter.

The mode of operation of the invention may now be noted, and first under the conditions which prevail when the continuous miner is neither advancing bodily nor retracting.

It will be understood that the conveyor end element 13 is periodically moved in an outbye (material discharging) direction (to the left in Figs. 1 and 2) a suitable distance, on the order of from eight or ten inches to two or three feet, depending on the drive provided. Ordinarily the stroke is greater with a hydraulic drive unit. Intermediate the discharge strokes the end element 13 will be moved inbye, and the motion inbye will be of such nature that the end element 13 and the conveyor trough line T to which it is fixed will slide beneath material lying upon them, while during travel in the outbye direction these elements will simply carry the superposed material with them, i. e. they won't tend to slip beneath the material.

It should also be noted that the pump 65 will be continuously driven in any suitable manner and will have a capacity a relatively small percent (say 10 or 20 percent) of the fluid consumption of the drum driving motor if the latter were to be driven continuously unidirectionally. The accumulator 75 will be charged at all times and any excess of fluid will be permitted to bleed back to the tank through the relief valve 71. The accumulator will desirably be of such capacity that relatively uniform pressure will be maintained at all times. The oil consumption for a single stroke may be less than 10% of the working capacity of the accumulator. When the shaker is in action, the strip will be unwound (be pulled off the drum) an amount equal to the material-moving travel of the main strip, and will be rewound on the drum during the return strokes of the main strip. As the supplemental strip is being pulled off the drum motor 35 will be driven backwards and act as a pump and suck oil from the tank and discharge it into the accumulator. Any excess from this pumping action, and any excess from the motorized pump, is discharged as necessary through the relief valve back to the tank, the valved conduit 77 then being closed.

Now, considering the mode of operation more in detail, during a period when the "continuous miner" is not advancing bodily, it will be understood that as the trough line T makes its outward, material-transporting movement, the motor 35 will be caused to act as a pump and will draw liquid through the conduit 69 from the reservoir and discharge it into the conduit 68. Most at least of this fluid will be forced into the accumulator 75 and any excess fluid delivered to the conduit 68 by the pump 65 and the motor 35 will be returned through the relief valve controlled conduit to the reservoir. When the inbye movement of the trough line T occurs, the motor 35 will be driven at least principally by fluid expelled from the accumulator and cause the strip 11 to be moved in the inbye direction so rapidly that it will move beneath the material resting upon it. When the drum or reel 15 is not moving bodily either inwardly or outwardly there will be a relatively continuous discharge of fluid through the relief valve controlled conduits substantially equivalent to the total discharge of the pump 65 less the leakage through the motor 35, which leakage, with a gear type motor may run on the order of perhaps 15%.

When the drum or reel 15 is being moved inbye with the miner as the latter is advancing to a new working position, it will be evident that strip must be payed off of the reel. Under these circumstances the motor must turn backwards enough to provide the necessary lengthening of the working length of strip. Accordingly, the amount of fluid delivered by the motor to the conduit will, if the reciprocation of the trough line continues at this time, be greater than the amount that passes through the motor when the latter is acting as a motor, and so the amount of fluid discharged through the pressure relief valve controlled conduits 72, 73 will be increased—at least this will be true ignoring leakage.

If the continuous miner is being backed outwardly, the amount of fluid taken by the motor 35 as it then winds in the element 11 will be increased, and the amount passing through the conduits 72, 73 will be reduced.

The pump 65 serves to charge the system to the requisite pressure, to make up leakage through the motor 35, to drive the motor 35 continuously when it is desired to wind the element 11 in continuously—as when it is detached from the trough line, and it may be used to enable the drum or reel to cause the strip to move the inbye end of the trough line inbye when this is of the flexible strip type and there is in the main conveyor system means permitting paying out of that strip. It can also be used to supply fluid to the motor to enable the latter to handle terminal portions of the main conveyor, if desired.

It will also be observed that the drum and drive thereof is suited to use as a rebound unit for a mechanically or hydraulically operated shaker strip provided the rebound force required is relatively low.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and in an outbye direction, a support disposed in line with the adjacent end of said trough line and movable a substantial distance in a direction longitudinal of said trough line portion towards and away from the latter, a flexible supplementary conveyor strip connected to said trough line portion and constituting a prolongation thereof, a reel mounted on said support to move bodily with the latter and having a portion of said flexible supplementary conveyor strip wound upon it, a hydraulic motor connected in driving relation to said reel, and means for supplying fluid to said motor to cause it to drive the reel in a strip winding direction including a portion for receiving fluid from said motor when traction on said strip causes the reel to drive the motor and including an accumulator connected with said motor in communication with the side of the latter to which fluid is supplied to cause it to drive said reel.

2. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and in an outbye direction, a support disposed in line with the adjacent end of said trough line and movable a substantial distance in a direction longitudinal of said trough line portion towards and away from the latter, a flexible supplementary conveyor strip connected to said trough line portion and constituting a prolongation thereof, a reel mounted on said support to move bodily with the latter and having a portion of said flexible supplementary conveyor strip wound upon it, a a hydraulic motor connected in driving relation to said reel, and means for supplying fluid to said motor to cause it to drive the reel in a strip winding direction including a portion for receiving fluid from said motor when traction on said strip causes the reel to drive the motor and including an accumulator connected with said motor in communication with the side of the latter to which fluid is supplied to cause it to drive said reel and means for supplying fluid to and venting fluid from said motor-accumulator couple.

3. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and in an outbye direction, a support disposed in line with the adjacent end of said trough line and movable a substantial distance in a direction longitudinal of said trough line portion towards and away from the latter, a flexible supplementary conveyor strip connected to said trough line portion and constituting a prolongation thereof, a reel mounted on said support to move bodily with the latter and having a portion of said flexible supplementary conveyor strip wound upon it, a hydraulic motor connected in driving relation to said reel, and means for supplying fluid to said motor to cause it to drive the reel in a strip winding direction including a portion for receiving fluid from said motor when traction on said strip causes the reel to drive the motor and including an accumulator connected with said motor in communication with the side of the latter to which fluid is supplied to cause it to drive said reel and means for supplying fluid to and venting fluid from said motor-accumulator couple including a pump and a relief valve at the discharge side of said pump.

4. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and an outbye direction, a support disposed in line with the adjacent end of said trough line and movable a substantial distance in a direction longitudinal of said trough line portion towards and away from the latter, a flexible supplementary conveyor strip connected to said trough line portion and constituting a prolongation thereof, a reel mountel on said support to move bodily with the latter and having a portion of said flexible supplementary conveyor strip wound upon it, and means for continuously exerting a torque on said reel in a winding direction to effect rewinding each time said trough line portion is moved towards said reel, of a portion of said strip drawn from said reel on movement of said strip effected by outbye movement of said trough line portion.

5. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and in an outbye direction, a machine constituting a source of material to be conveyed and movable a substantial distance in a direction longitudinal of said portion towards and away from the latter, and means for conveying material delivered by said machine to said portion including a flexible supplementary conveyor strip connected to said portion and constituting a prolongation thereof, a reel mounted to move bodily with said machine and having a portion of said flexible supplementary conveyor strip wound on it, and means for continuously exerting a torque on said reel in a winding-in direction to effect rewinding when said trough line portion is moved in the inbye direction, of a portion of said strip pulled off of said reel on movement of said strip effected by outbye movement of said trough line portion.

6. In combination, a shaker conveyor comprising a trough line and means for imparting to said trough line a shaker conveyor motion, said trough line having a portion at one end thereof for the reception of material to be moved along said trough line to a point of discharge and moving with a shaker conveyor motion alternately in an inbye and in an outbye direction, a machine constituting a source of material to be conveyed and movable a substantial distance in a direction longitudinal of said portion towards and away from the latter, and means for conveying material delivered by said machine to said portion including a flexible supplementary conveyor strip connected to said portion and constituting a prolongation thereof, a reel mounted to move with said machine and having a portion of said flexible supplementary conveyor strip wound on it, and means for continuously exerting a torque on said reel in a winding-in direction including a source of hydraulic fluid, a pump having an intake connected with said source and a discharge line having a pressure relief valve controlled return line to said source, a motor drivingly connected with said reel and having a fluid supply connection with which said discharge line communicates and an exhaust connected with said fluid source, and an accumulator connected in communication with said discharge line.

7. In a shaker conveyor apparatus, an element reciprocating for substantial periods in a relatively short, relatively fixed path, a flexible conveyor strip secured at one end to said element, a reel to which said strip is secured at its other end and on which a variable length of said strip is wound depending on the proximity of said reel to said element, means for supporting said reel and moving the same bodily towards and away from said element, and means for causing said reel to wind in strip when said element moves along its paths towards said reel and for permitting said reel to be rotated in an unwinding direction when said element moves in the opposite direction along its path including a motor connected in driving relation to said reel, a pump delivering fluid under pressure to said motor to drive the latter in a direction to rotate said reel in a winding-in direction, means for automatically limiting the pressure at which such fluid is delivered and an accumulator connected between said pump and said motor and an exhaust line from said motor.

8. In a shaker conveyor apparatus, an element normally reciprocating for substantial periods in a relatively short, relatively fixed path, a flexible conveyor strip secured at one end to said element, a reel to which said strip is secured at its other end and on which a variable length of said strip is wound depending on the proximity of said reel to said element, means for supporting said reel and for moving the same bodily towards and away from said element, and means for causing said reel to wind in strip when said element moves along its path towards said reel and for permitting said reel to be rotated in an unwinding direction when said element moves in the opposite direction along its path including a motor having a fluid supply connection and connected in driving relation to said reel, a pump delivering fluid under pressure to said motor fluid supply connection to drive said motor in a direction to rotate said reel in a winding-in direction, means for automatically limiting the pressure at which such fluid is delivered, an accumulator connected to said motor fluid supply connection, and an exhaust line from said motor.

9. Shaker conveyor apparatus comprising, a reciprocable element, an elongated flexible conveyor strip secured at one end to said element so as to be longitudinally reciprocable thereby, a reel to which said strip is secured at its other end and on which a variable length of said strip is wound depending on the proximity of said reel to said element, means for supporting said reel and moving said reel towards and away from said element, and means for continuously exerting a torque on said reel in a winding direction to effect rewinding of a portion of said strip drawn from said reel on movement of said strip effected by outward movement of said element each time said element is moved towards said reel.

10. Shaker conveyor apparatus comprising, a reciprocable element having one end of an elongated flexible conveyor strip secured thereto so as to obtain longitudinal reciprocable movement thereof, a reel to which said strip is secured at its other end on which a variable length of said strip is wound depending on the proximity of said reel to said element, means for supporting said reel and moving the same bodily towards and away from said element, driving means connected to said reel which is operable in one direction to drive said reel to wind said strip when said element moves toward said reel, and said driving means being operable in a direction opposite said one direction to unwind said strip when said element moves away from said reel.

References Cited in the file of this patent
UNITED STATES PATENTS

| 2,082,473 | Tyler | June 1, 1937 |
| 2,395,302 | Slomer | Feb. 19, 1946 |
| 2,467,238 | Slomer | Apr. 12, 1949 |
| 2,566,629 | Paxson | Sept. 4, 1951 |